(12) United States Patent
Hunter

(10) Patent No.: US 8,949,535 B1
(45) Date of Patent: Feb. 3, 2015

(54) CACHE UPDATING

(71) Applicant: Amazon Technologies, Inc., Reno, NV (US)

(72) Inventor: Jamie Hunter, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 13/758,920

(22) Filed: Feb. 4, 2013

(51) Int. Cl.
*G06F 12/02* (2006.01)
*G06F 12/08* (2006.01)
*G06F 11/07* (2006.01)
*G06F 9/45* (2006.01)

(52) U.S. Cl.
CPC .......... *G06F 12/0891* (2013.01); *G06F 11/073* (2013.01); *G06F 8/454* (2013.01); *G06F 2212/50* (2013.01)
USPC ............ 711/119; 711/154; 711/156; 711/158

(58) Field of Classification Search
CPC . G06F 12/0891; G06F 2212/50; G06F 8/454; G06F 11/073
USPC ................................. 711/119, 154, 156, 158
See application file for complete search history.

(56) References Cited

U.S. PATENT DOCUMENTS

| | | | |
|---|---|---|---|
| 6,338,124 B1 * | 1/2002 | Arimilli et al. .............. 711/144 |
| 7,213,109 B1 * | 5/2007 | Bauman et al. .............. 711/133 |
| 7,280,745 B2 * | 10/2007 | Mollie et al. .................. 386/200 |
| 7,296,155 B1 * | 11/2007 | Trostle et al. ................. 713/170 |
| 7,376,797 B2 * | 5/2008 | Azuma ........................ 711/144 |
| 7,581,064 B1 * | 8/2009 | Zedlewski et al. ............ 711/118 |
| 8,285,925 B1 * | 10/2012 | Sorenson et al. ............. 711/113 |
| 8,316,213 B1 * | 11/2012 | Sorenson et al. ............. 711/216 |
| 8,326,985 B2 * | 12/2012 | Luna et al. .................... 709/224 |
| 8,364,898 B2 * | 1/2013 | Balakrishnan et al. ....... 711/133 |
| 8,412,823 B1 * | 4/2013 | Richardson et al. .......... 709/225 |
| 8,521,771 B1 * | 8/2013 | Sorenson et al. ............. 707/770 |
| 8,621,182 B1 * | 12/2013 | Sorenson et al. ............. 711/216 |
| 8,639,724 B1 * | 1/2014 | Sorenson et al. ............. 707/796 |
| 8,688,912 B2 * | 4/2014 | Sorenson et al. ............. 711/118 |
| 8,782,222 B2 * | 7/2014 | Luna et al. .................... 709/224 |
| 2003/0236961 A1 * | 12/2003 | Qiu et al. ...................... 711/170 |
| 2006/0218218 A1 * | 9/2006 | Ganesan et al. .............. 709/200 |
| 2013/0046934 A1 * | 2/2013 | Nychka et al. ................ 711/119 |

* cited by examiner

*Primary Examiner* — Stephen Elmore

(74) *Attorney, Agent, or Firm* — Thorpe North & Western LLP

(57) ABSTRACT

Technology is described for performing cache data invalidations. The method may include identifying cache update information at a first cache. The cache update information may identify a cache entry (e.g., a trending cache entry). A second cache may be selected to receive the cache update information from the first cache. The cache update information identifying the cache entry may be sent from the first cache to the second cache. For example, the second cache may be populated by adding the trending cache entry into the second cache.

27 Claims, 10 Drawing Sheets

CACHE UPDATING

BACKGROUND

Data may be temporarily stored in a cache in order to speed up future requests for frequently accessed data, as opposed to accessing a slower device or more remote device where a complete copy of the data may be stored. For example, the data stored in the cache may include values that have been previously computed. In response to receiving a request for data stored in the cache, the cache may be read to access the requested data. When the data requested is not stored in the cache, the data may be recomputed or retrieved from an original storage location, which may involve additional retrieval time compared to accessing data stored in the cache. Therefore, the overall system performance may increase when data requests can be served by accessing the cache.

The cache may include a pool of cache entries, with each cache entry in the pool having a piece of data. In addition, a copy of each cache entry may be stored in the original storage location. A cache client may desire to access a cache entry. The cache may determine whether the requested cache entry is present (i.e., a cache hit). For example, a web application may check its cache to determine whether the cache includes data requested by a web application user. In response to a cache hit, a cache may proceed to provide the cache entry to the client.

When the cache determines that the requested entry is not stored on the cache (i.e., a cache miss), the requested entry may be loaded from the original storage location. In addition, a previously uncached entry may be copied into the cache for future requests involving the cache entry. After a cache miss, the system may remove an existing cache entry before adding the previously uncached entry to the cache (i.e., a replacement policy). The replacement policy may remove the existing cache entry according to a least recently used (LRU) method or a least frequently used (LFU) method.

DETAILED DESCRIPTION

Figure 1:
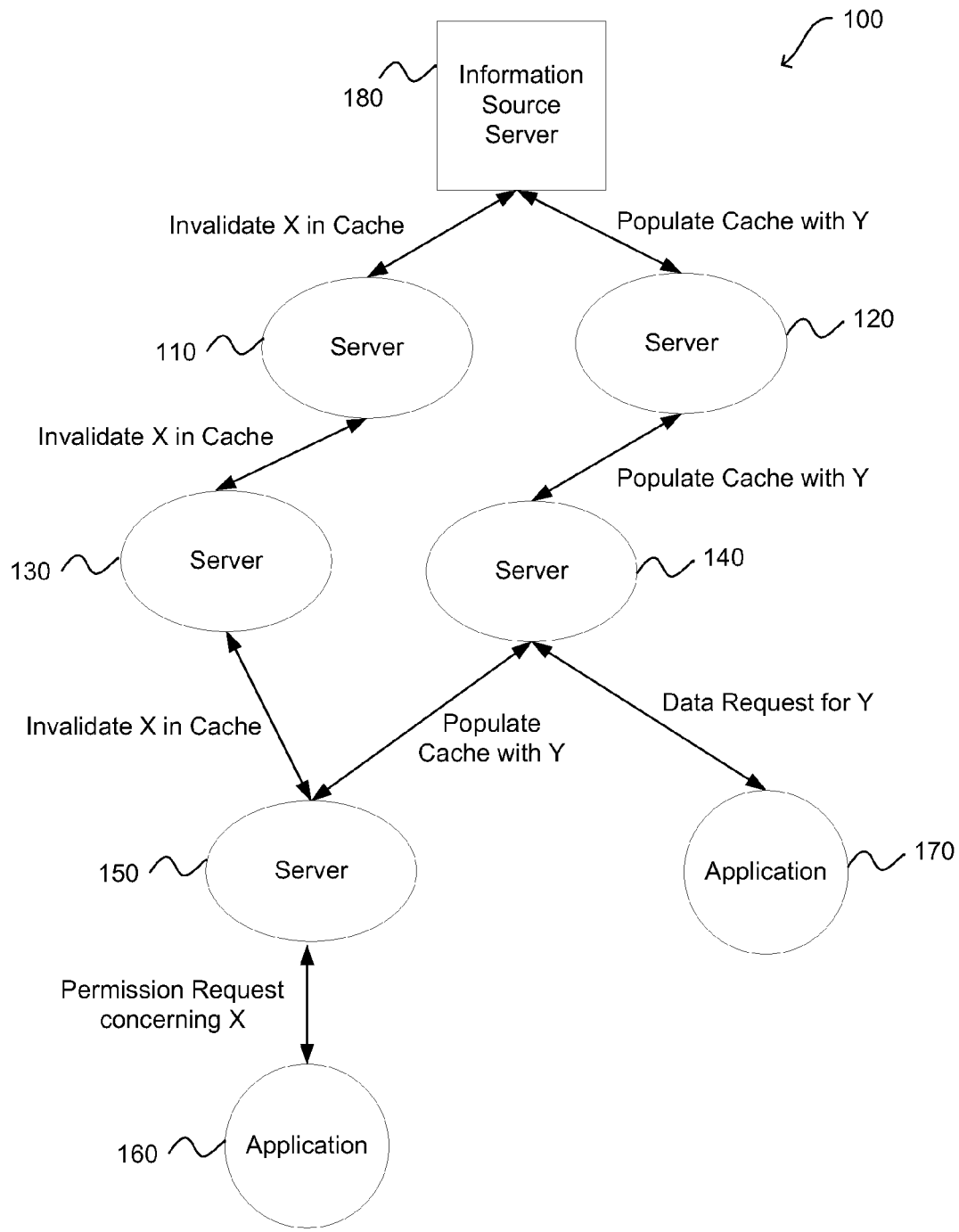
FIG. 1 is an illustration that depicts a system for cache updating according to an example of the present technology.

A technology may be provided for performing cache data invalidation, cache updates, supplying trending data, and other caching functions. A cache may invalidate and/or update a cache entry using a gossip protocol. The gossip protocol may be a computer-to-computer communication protocol inspired by the form of gossip seen in social networks. For example, one cache may receive cache update information from another cache. The cache update information may include information revealing that a particular cache entry (e.g., an authorization permission) has been revoked, thereby informing the cache to revoke the cache entry. The cache receiving the cache update information may gossip (i.e., send) the cache update information to at least one other cache. By allowing the caches to exchange cache update information, the gossip protocol may allow cache update information to propagate to a plurality of caches in a network during a short period of time.

The cache update information may include cache data invalidations. For example, the caches may exchange information on cache entries that are stale or otherwise invalid. After receiving the gossiped data, a cache may act accordingly (e.g., by deleting a stale cache entry and/or replacing a stale cache entry with an updated entry). In addition, the cache may store the gossiped data (i.e., the cache update information) received until the gossip data becomes stale (e.g., by exceeding a service level agreement (SLA) for staleness), until the cache receives cache update information indicating that the gossiped data has become stale, or until an updated cache entry is received to replace the old entry. In one example configuration, the cache update information may include information revealing that a particular cache entry may be trending. A trending cache entry may include a "hot" or "popular" cache entry. For example, a video may currently be popular. Due to the video's popularity, the video may be expected to be watched by many users. Therefore, a cache may be notified of the trending cache entry when receiving the cache update information, and the hot cache entry may be pre-populated into the cache. Upon receiving the hot cache entry, the cache may use the gossip protocol to send the hot cache entry to other caches in the network.

By using the gossip protocol, the caches may exchange cache update information with other randomly selected caches and at a predetermined frequency (e.g., a heartbeat). For example, a cache may exchange data with a different cache every set period of time, such as every 5 to 60 seconds. Since the caches may exchange cache update information based on the predetermined frequency, there may be a high probability that a cache can receive cache update information from the other caches within a useful amount of time. For example, a network may have ten caches each with a heartbeat of 20 seconds. Therefore, each of the ten caches may exchange cache update information with another cache at 20 second intervals. Since the cache update information exchanged between the ten cache may occur over time (i.e., not simultaneously) for the ten caches, the caches may receive cache update information within a number of heartbeat cycles. In addition to using the gossip protocol for discovering other caches in the network, a cache may use other device and discovery methods to find other caches.

In one example, a cache that sends cache update information to another cache may initially receive the cache update information from an information source server (e.g., a source of truth). The information source server may propagate the cache update information to the cache based on the gossip protocol or simply seed caches that use the gossip protocol. The information source server may possess a master copy of the data (e.g., a master copy of some permissions) and the cache update information. For example, the information source server may learn of information (e.g., a cache invalidation, a cache update, a trending cache entry, etc.), and then start the spread of that information to a plurality of caches. In other words, the "gossip" of the cache update information may begin with the information source server communicating the gossip to a cache. According to the gossip protocol, the information source server may randomly select a cache known to the information source server and communicate the cache update information to the cache at a predetermined frequency (e.g., every 20 seconds). In an alternative example, the gossip may begin with the cache communicating with the information source server. Once the cache receives the cache update information from the information source server, the cache may periodically gossip the cache update information to at least one other cache each period in order to reach a plurality of other caches over time using the gossip protocol.

The cache may be located on or include a server or a computing device, and the cache may be included in a distributed caching network. The distributed caching network may include a plurality of caches used to perform caching for a server that may be an information source server or a source of truth.

FIG. 1 is an illustration that depicts a system 100 for performing cache data invalidation according to an example of the present technology. The system 100 may include an information source server 180, servers 110, 120, 130, 140 and 150, and applications 160 and 170. Each server be also considered a cache or contain a cache. The information source server 180 may be notified that X (e.g., a permission to access a network) has become invalid. In addition, the information source server 180 may be notified that Y (e.g., product information related to a video game) has become hot.

According to a gossip protocol, the information source server 180 may gossip the cache update information involving permission X to server 110. For example, the information source server 180 may communicate the gossip to server 110 according to a heartbeat of 40 seconds. Subsequently, the server 110 may exchange cache update information with server 130 based on the gossip protocol. Therefore, server 130 may receive instructions to invalidate permission X in its cache. In addition, the server 130 may exchange cache update information (which includes information to invalidate permission X in the cache) with the server 150.

An application 160 (e.g., a service) may request to receive permission X from the server 150. For example, the application 160 may request permission X in order to gain access to the network. The server 150 may check its cache and determine that the cache entry associated with permission X has been invalidated based on the cache update information received from server 130. The server 150 may respond to the application 160 with an updated cache entry associated with permission X. The server 150 may have received the updated cache entry when receiving the cache update information from server 130. In one example, the server 150 may retrieve the cache entry associated with permission X from the information source server 180 or another original storage location.

In another example, the information source server 180 may gossip cache update information involving updated product information Y to the server 120. Thereafter, the server 120 may populate its cache with the product information Y. Subsequently, the server 120 may exchange cache update information with the server 140 based on the gossip protocol. In addition, the server 140 may exchange cache update information with the server 150. Thus, the server 150 may have received cache update information to invalidate permission X and add product information Y to its cache. An application 170 may request to access product information Y from the server 140. The server 140 may check its cache, determine that product information Y has been added to the cache as a cache entry and is not stale, and then the product information Y may be sent to the application 170.

A cache entry may be invalidated to force a cache miss. In other words, a request for an invalidated entry may result in a cache miss because the entry was invalidated from the cache. In some examples, a cache miss may indicate that the entry is not in the cache, or that the cache entry is considered stale and has not been refreshed. A cache entry (e.g., product data) may be kept in the cache for a period of time (e.g., 4 hours) before the cache entry is refreshed due to the expectation of receiving gossiped cache information. However, if the cache entry changes (e.g., the product data changes), then the cache entry may be updated to reflect the change as gossip is received. Using the gossip protocol, the server may refresh the cache less frequently because the server may be confident that cache updates will be received when information is available. For example, a server may use cache data within a 2-hour staleness SLA (Service Level Agreement) as opposed to a 5 minute staleness SLA, because the server may likely receive cache updates through the gossip protocol.

Figure 2:
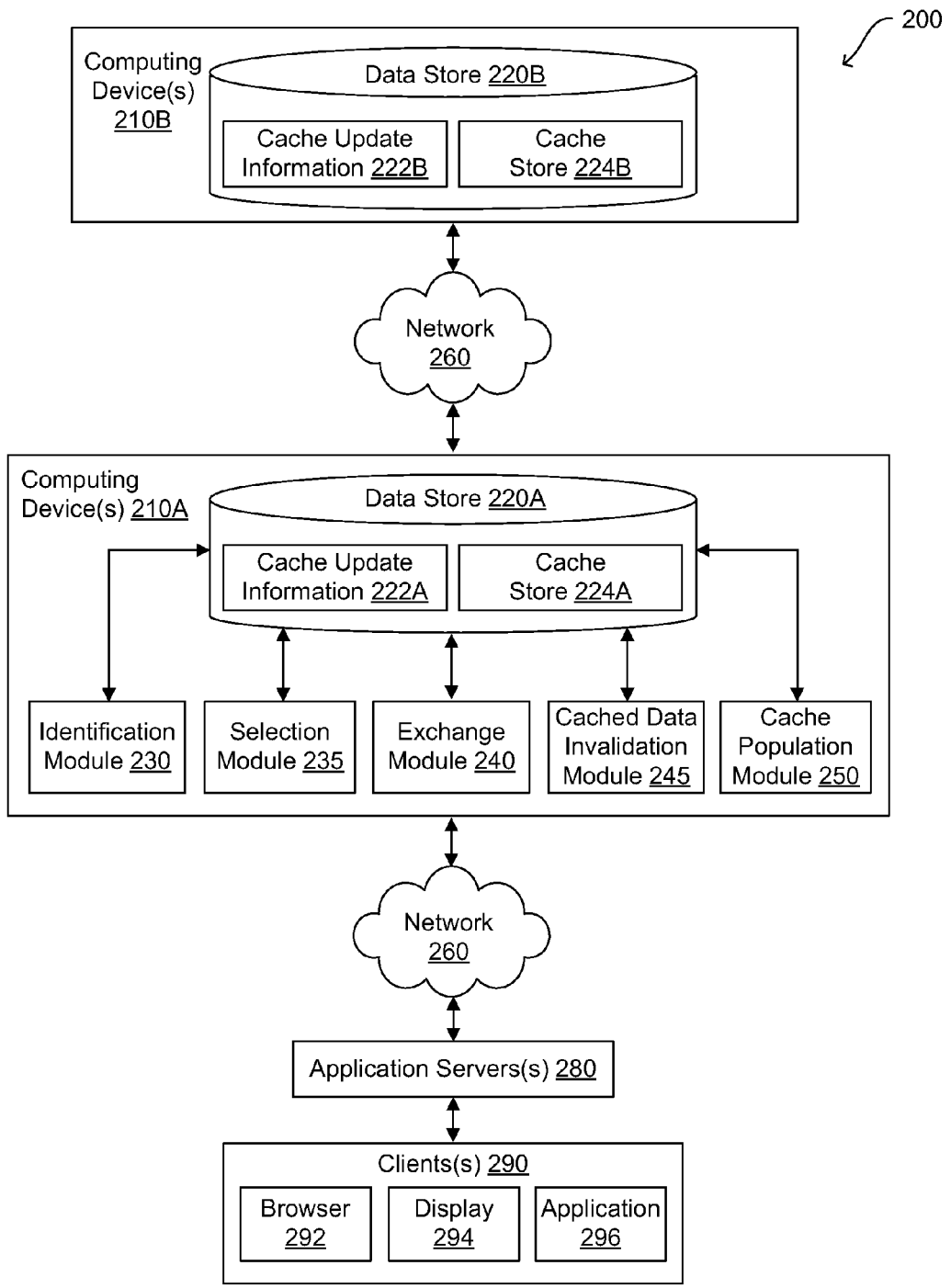
FIG. 2 is an illustration of a networked environment used for performing cache updating according to an example of the present technology.

In the following discussion, an example description of the system and the system's components is provided, followed by a discussion of the operation of the same. FIG. 2 shows a networked environment 200 according to an example of the present technology. The networked environment 200 may include one or more computing devices 210A-B in data communication with a plurality of application servers 280 by way of a network 260. In addition, the networked environment 200 may include the one or more computing devices 210A in data communication with a plurality of other computing devices 210B by way of the network 260. The network 260 may include the Internet, intranets, extranets, wide area networks (WANs), local area networks (LANs), wired networks, wireless networks, or other suitable networks, etc., or any combination of two or more such networks. The networked environment 200 may also include one or more clients 290, such as tablets, laptops, personal computers, cell phones, and so on, which may or may not be coupled to the network 260.

The computing devices 210A and 210B may be a plurality of servers, with each server having a cache store 224A. The cache store 224A may be a hardware cache stored in physical memory or a software based cache that is stored on the data store. In one example, the computing devices 210A and 210B may be part of a distributed cache network. The computing devices 210A-B may exchange information (e.g., gossip information) by way of the network 260. The computing device 210A may store the gossip information in the data store 220A and the computing device 210B may store the gossip information in the data store 220B. In addition, the computing device 210A may provide the gossiped cache information via the network 260 as requested by the application servers 280 and/or the clients 290.

The computing devices 210A and 210B may comprise, for example, a server computer or any other system providing computing capability. Alternatively, a plurality of computing devices 210A and 210B may be employed and arranged, for example, in one or more server banks, computer banks or other computing arrangements. For example, a plurality of computing devices 210A and 210B together may comprise a centralized computing resource, virtualization server, a grid computing resource, and/or any other distributed computing arrangement. Such computing devices 210A and 210B may be located in a single installation or may be distributed among many different geographical locations. For purposes of convenience, the computing device 210A and the computing device 210B are referred to herein in the singular. Even though the computing devices 210A and 210B are referred to in the singular, it is understood that a plurality of computing devices 210A and 210B may be employed in the various arrangements as described above.

The clients 290 may be representative of a plurality of client devices that may be coupled to the network 260. The clients 290 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability. The clients 290 may include a respective display 294, as well as a browser 292. The browser 292 may be executed on a client 290, for example, to access and render network pages (e.g. web pages) or other network content served up by the computing devices 210A-210B and/or other servers. The display 294 may comprise, for example, one or more devices such as cathode ray tubes (CRTs), liquid crystal display (LCD) screens, gas plasma-based flat panel displays, LCD projectors, or other types of display devices, etc.

The clients 290 may be configured to execute various applications such as a browser 292, and/or other applications 296. The applications 296 may include web application or network application that may be executed in the browser 292. The applications 296 may correspond to standalone applications, such as mobile applications. In addition, the client 290 may be configured to execute applications 296 that include, but are not limited to, video playback applications, standalone applications, email applications, instant message applications, and/or other applications. The clients 290 may be coupled to an application server 280 over a network (not shown).

Various applications and/or other functionality may be executed in the computing devices 210A and 210B according to various embodiments. Also, data may be stored in data stores 220A and 220B that are accessible to the computing devices 210A and 210B. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data stores 220A and 220B, for example, are associated with the operation of the various applications and/or functional entities described below.

The data stored in the data store 220A may include cache update information 222A, and the data stored in the data store 220B may include cache update information 222B. As used herein, the term "cache update information" generally refers to updated cache entries or cache instructions that identify an invalid cache entry, update entries, and/or a that transfer trending (i.e., hot or popular) cache entry. In addition, the terms "cache entry" and "cache data" may be used interchangeably. The cache store 224A and 224B may include, but is not limited to, cache entries relating to authorization permissions, audio information, video information, network page information, web application components, network application components, middleware, purchasing components, account information, security information, and/or product data. The cache entries may be stored for a predetermined period of time (e.g., 2 hours) or until the cache entries become stale as defined by an SLA (Service Level Agreement). In addition, the cache update information 222A may be communicated (i.e., gossiped) to the computing devices 210B via the network 260 based on a gossip protocol. Thus, the cache update information 222A may cause the computing device 210B to either invalidate an invalid cache entry, update invalid cache entries, and/or or populate a trending data entry into the cache. The cache update information 222A and 222B may include a cache data entry. In some examples, the cache update information 222A may be received by the computing device 210A from an information source server and/or other computing devices based on the gossip protocol.

The data stored in the data store 220A may include cache store 224A, and the data stored in the data store 220B may include cache store 224B. As used herein, the term "cache information" generally refers to a pool of cache entries stored for retrieval. In addition, a cache entry may include at least one piece of data. The cache store 224A may include values that have been computed earlier and stored in an information source server. The cache store 224A and 224B may also include duplicate values of data entries, where the original values are stored in a separate data store. The cache entries may be temporarily stored in the cache store 224A and 224B, and the cache entries may be accessed by a central processing unit (CPU), hard drive, web server, web application, etc. In addition, the cache entries in the cache store 224A and 224B may be related to various types of information, such as authorization permissions, audio information, video information, account information, security information, web application data, and/or product data.

The components executed on the computing device 210A may include an identification module 230, a selection module 235, an exchange module 240, a cache data invalidation module 245, a cache population module 250 and other applications, services, processes, systems, engines, or functionality not discussed in detail herein. The computing device 210B may include the modules illustrated in computing device 210A even though such modules are not shown in FIG. 2.

The identification module 230 may be configured to identify cache update information stored on a cache data store. The cache update information may identify an invalid cache entry, an updated cache entry, or a cache entry that is trending. The cache update information 222A identified by the identification module 230 may be stored on the data store 220A for a predetermined period of time (e.g., 3 hours). The identification module 230 may identify cache update information that is stale (e.g., a cache entry at 4 hours is stale when the service level agreement (SLA) of staleness for that cache entry is 2 hours). In addition, the identification module 230 may identify updated cache entries (e.g., video information, product data) and/or trending cache entries (i.e., being accessed at a frequency that exceeds a predetermined threshold). Thus, the identification module 230 may record the cache update information 222A to identify updated cache entries (i.e., not stale), invalidated cache entries and/or trending cache entries.

The selection module 235 may be configured to select a receiving server to receive the cache update information from the cache data store using a gossip protocol. The selection module 235 may select the receiving server (e.g., the computing device 210B) to receive the update cache information within a predefined time period based on the gossip protocol. In some examples, the predefined time period may be known as a "heartbeat." For example, the selection module 235 may select the computing device 210B to receive cache update information in 20 second intervals (i.e. every 20 seconds a computing device may be selected). In general, the frequency that the selection module 235 may select a computing device 210B (i.e. the heartbeat) may be determined based on the gossip protocol and may vary from 3 seconds up to several minutes. In addition, the selection module 235 may select the computing device 210B at random using a random number generator routine or hardware randomizer.

In one configuration, the computing device 210B may be registered to be included in a particular host class. The host class may include a plurality of registered computing devices on a network with similar functions and/or capabilities. The selection module 235 may select the computing device 210B to receive the cache update information by randomly selecting the computing device 210B from the host class of registered computing devices, or the selection module 235 may utilize other methods for identifying (i.e., discovering) computing devices and/or servers in the network to receive the cache update information 222A.

The exchange module 240 may be configured to exchange the cache update information identifying the invalid cache entries or updated cache entries with the receiving server. After selecting a receiving server (e.g., the computing device 210B), cache update information may be exchanged with the computing device 210B. When an exchange of cache update information occurs, a source server (e.g., the computing device 210A) may send known cache updates (e.g., cache data invalidations) to the computing device 210B. In addition, the computing device 210A may request computing device 210B to respond with cache updates known to the computing device 210B. In response to the request from the source server, the receiving server may send the known cache updates to the source server. This exchange allows each computing device to learn about cache entries from the computing device being sent the cache update information 222A. In addition, the cache entries exchanged between the computing device 210A and the computing device 210B may be updated cache entries that are trending (e.g., an audio clip).

The exchange module 240 may determine an updated version of a cache entry after exchanging a source cache entry (e.g., included in the cache update information 222A) with a receiving cache entry associated with the receiving server (e.g., computing device 210B). The source cache entry may have a first version number (e.g., version 5) and the receiving cache entry may have a second version number (e.g., version 3). The exchange module 240 may compare the first version number (e.g., version 5) of the source cache entry with the second version number (e.g., version 3) of the receiving cache entry. Since the second version number (e.g., version 3) is older than the first version number (e.g., version 5), the exchange module 240 may determine that the receiving cache entry associated with the second version number is stale. In other words, the exchange module 240 may determine that a version number associated with the receiving cache entry is older than a version value associated with the source cache entry which means the older cache entry is more stale than the cache entry received.

The cache data invalidation module 245 may mark a cache entry as invalid based on the cache update information received from the receiving server. For example, the source server (e.g., the computing device 210) may receive cache update information in an exchange from the receiving server (e.g., the computing device 270). In particular, the cache update information may identify that permission M is invalid. Thereafter, the cache data invalidation module 245 may mark the invalid cache entry (e.g., permission M) as invalid on the source server. In other words, the source server may update its own cache based on the cache update information received. For another example, the cache data invalidation module 245 may invalidate a stale cache entry residing on the source server by deleting the stale cache entry and replacing the stale cache entry with a valid entry (i.e., not stale) from the receiving server. Further, the cache data invalidation module 245 may invalidate an invalid cache entry by deleting the invalid cache entry after a period of time (e.g., 3 hours).

The cache population module 250 may be configured to populate the cache store 224A of the computing device 210A by adding a trending cache entry based on the cache update information exchanged with the receiving server (e.g., the computing device 210B). For example, during an exchange of cache update information based on a gossip protocol, the source server (i.e., the computing device 210A) may have received a trending cache entry from the receiving server (the computing device 210B). The trending cache entry may be related to authorization permissions, audio information, video information, network page information, web application components, purchasing components, account information, security information, product data, etc. For example, the trending cache entry may be a video clip of a soccer match. Therefore, based on the trending cache entry received from the receiving server, the cache population module 250 may pre-populate the cache information 224A with the trending cache entry even before the cache entry has been requested by a client or user. The cache population module 250 may add the trending cache entries that are valid (i.e., not stale) to the cache store 224A. By pre-populating the cache information 224A with trending data entries that are known, the computing device 210A may operate more efficiently in responding to requests for the cache entries.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or consumer devices. For example, modules providing services may be considered on-demand computing that is hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide ongoing access to the module or the third party access may be based on a per transaction access where the third party pays for specific transactions that are provided and consumed.

Figure 3A:
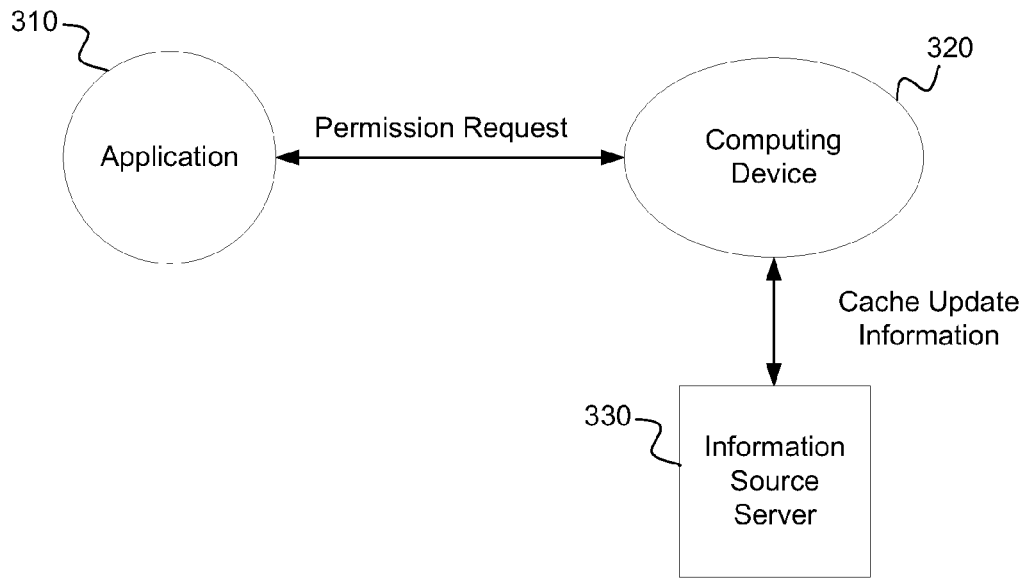
FIGS. 3A-3C are block diagrams that illustrate exemplary cache updates by computing devices according to an example of the present technology.
Figure 3B:
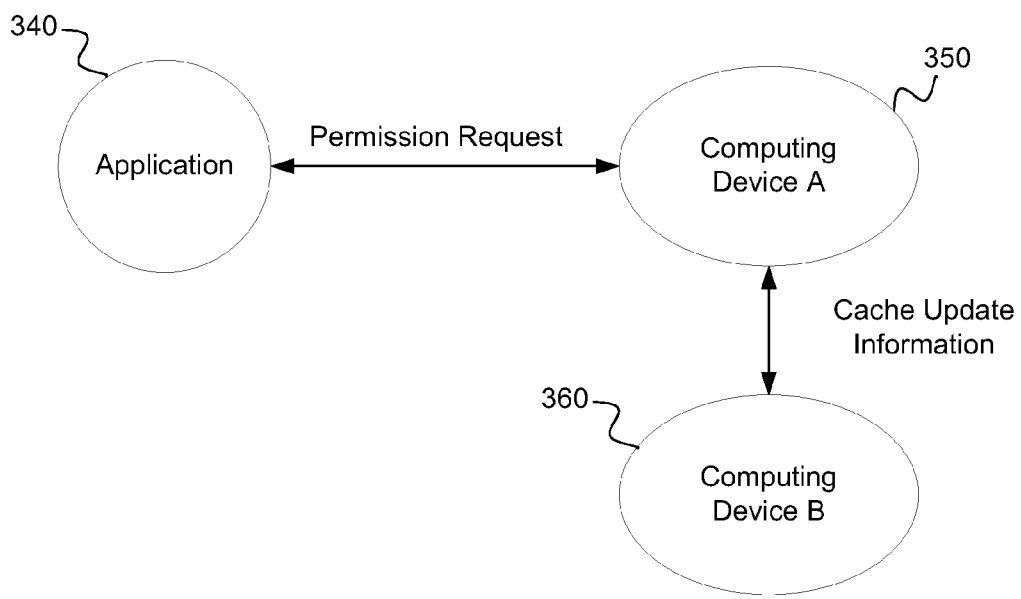
Figure 3C:
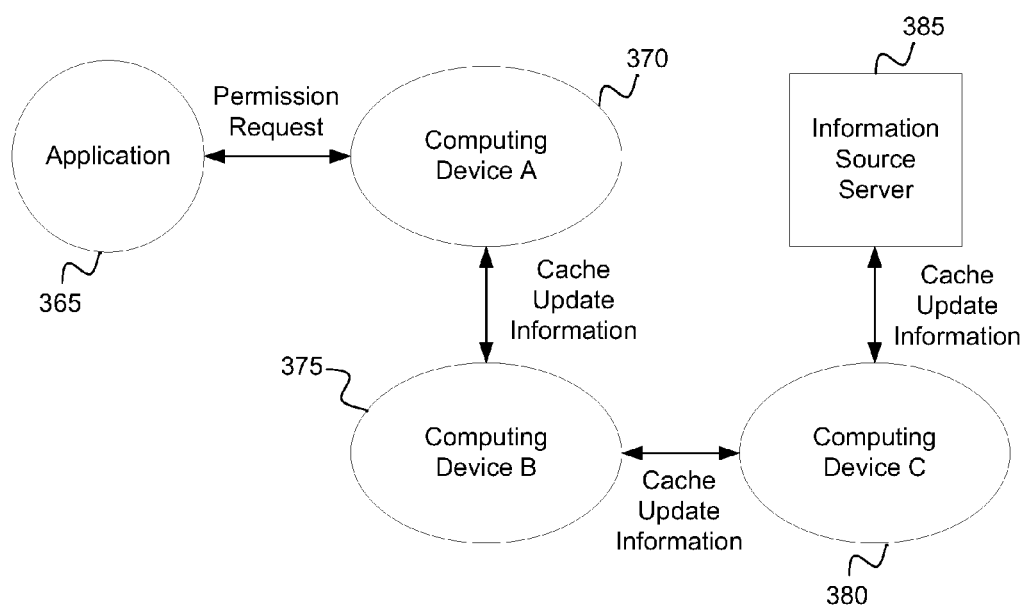

FIGS. 3A-3C are drawings that illustrate cache updates by various computing devices according to examples of the present technology. In FIG. 3a, a computing device 320 may receive cache update information from an information source server 330 via the gossip protocol. The information source server 330 may be considered a "source of truth" server. As previously discussed, the cache update information may include updated cache entries that identify an invalid cache entry, updated cache entry, and/or a trending (i.e., hot, popular) cache entry. In one example, the information source server 330 may randomly communicate with the computing device 320 based on a gossip protocol. The information source server 330 may send cache updates to a randomly selected computing device 320. The information source server 330 may gossip cache update information according to a heartbeat (e.g., 30 seconds). Every 30 seconds, the information source server 330 may select a computing device (e.g., computing device 320) to send cache update information. In this example, the information source server 330 may communicate with at least one computing device every 30 seconds. The heartbeat of the information source server and/or the computing device may be random (e.g., between 5 seconds and 60 seconds). In an alternative configuration, the information source server 330 may send cache updates to the computing device 320 in response to the computing device 320 initiating communication with the information source server 330 through the gossip protocol. In other words the computing device 320 may be allowed to randomly select the information source server to communicate with while using the gossip protocol.

The information source server 330 may perform the initial validation (or invalidation) of a cache entry. For example, the information source server 330 may include a master copy of a plurality of permissions (i.e., the cache entries). Furthermore, a permission update (or a permission invalidation) may be communicated to at least one other computing device (e.g., computing device 320) by the information source server 330. In one example, the information source server 330 may be a service that becomes informed when a permission is revoked. In addition, the information source server 330 may be notified of trending cache entries and may subsequently gossip the trending cache entries to a plurality of computing devices (e.g., computing device 320). The information source server 330 may be a single device in a network. Alternatively, the information source server 330 may span a plurality of devices in the network.

Referring again to FIG. 3A, an application 310 may request information (e.g., the permission "is X allowed to do Y") from the computing device 320, for example. The request may take a period of time to perform (e.g., 10 milliseconds). In response to the request, the computing device 320 may check its cache to determine whether the requested information is stale. The computing device 320 may learn that the requested information is five minutes stale, and that time is within the service level agreement (SLA) of permission staleness. In other words, a cache entry that is within the SLA time limit may be considered acceptable and not stale. The SLA may be considered an amount of time to keep an entry in the cache. The computing device 320 may then reply to the application 310 with the requested information (e.g., the permission "is X allowed to do Y"). A stale cache entry that exceeds the SLA may be invalidated, if desired.

The application 310 may also be an authorization server. The authorization server may desire authorization information from the computing device 320 to verify an individual's (e.g., an employee) permission to access to another particular server (e.g., server N not shown). Specifically, the computing device 320 may be a server containing a cache of authorization information to control access to other servers. The information source server 330 may learn that the employee was recently fired and therefore does not have permission to access server N. In other words, the cache data "employee has permission to access server N" may be invalidated. So, the information source server 330 may gossip the invalidation to the computing device 320 and subsequently, the computing device 320 may update its cache to reflect the updated data. When the application 310 requests the permission regarding the employee's access from the computing device 320, the computing device 320 may communicate that the employee does not have access to server N. Using a gossip protocol to propagate a cache invalidation (e.g., for an invalid permission) to a plurality of computing devices in a network may be effective, as statistically, a majority of the computing devices in the network may receive the update within a useful amount of time. Although it may be possible that a particular computing device with the cache entry in the network does not receive the update through the gossip protocol, the probability that the particular application may access the incorrect cache entry for the fired employee (e.g., to hack into the network) may be minimal.

In FIG. 3B, an application 340 may request a permission (e.g., is X allowed to do Y) from a cache of the computing device A 350. The computing device A 350 may send cache information to the application 340 based on cache update information received from the computing device B 360. For example, the computing device A 350 may have selected computing device B 360 based on a gossip protocol. After selecting the computing device B 360, the computing device A 350 and the computing device B 360 may exchange cache update information. The cache update information may include information that "X is allowed to do Y." In other words, the permission "is X allowed to do Y" may be a valid cache entry. Thus, the computing device A 350 may respond to the request from the application 340 by using the valid cache entry "is X allowed to do Y."

In some examples, the computing device A 350 and the computing device B 360 may be included in a plurality of computing devices in a network or as part of a caching subgroup within a network. In the past, communicating cache invalidation may have involved organizing a topography of the plurality of caches, and then using a tree structure or another graph structure the cache invalidation was pushed out to the plurality of computing devices. In addition to building a topographical map, the map may be adjusted when certain services (e.g., cache nodes) go out of action. Thus, invalidating cache entries by using a topographical network of the plurality of computing devices may be costly. In contrast, using a gossip protocol to communicate the cache invalidation may be advantageous because by using the heartbeat of a cache, the cache invalidation may be gossiped to a plurality of computing devices with caches using incremental amounts of network bandwidth, as opposed to large amounts of immediate bandwidth that may congest a network in a large cache pushing operation. Furthermore, the gossip protocol may statistically ensure that each computing device receives the cache update information within a useful amount of time.

In an example, the application 340 may request data concerning a product (e.g., a video game console). The video game console information may be accessible for purchase on a network site of an online retailer. The information about this product may be accessible on the computing device A 350. Since the product data may be accessed frequently, the product data may be stored in a cache of the computing device A 350. However, the currently cached version of the network site may have inaccurate details about the product (e.g., price, product details). The computing device A 350 may learn about the cache entry invalidation (i.e., the incorrect product data) through gossip information received from the computing device B 360. Thus, the product details in the cache of the computing device A 350 may be evicted (i.e., invalidated) to stop customers from viewing the inaccurate details about the product. In this example, utilizing the gossip protocol may be advantageous because the computing device A 350 may be promptly notified of the cache invalidation. In contrast to past methods, an information source server may avoid attempting to communicate (i.e., push) the cache invalidation to each computing device in the network using a topology or another push method.

In FIG. 3C, an information source server 385 may learn that a cache entry (e.g., a permission) is invalidated. The information source server 385 may gossip the invalidated cache entry by sending cache update information to a computing device C 380. The computing device C 380 may gossip the cache update information to a computing device B 375, which may, in turn, gossip the cache update information to a computing device A 370. Based on the cache update information received from the computing device A 370, the computing device A 370 may revoke the invalidated cache entry from its cache. In addition, the cache update information may include a newer cache entry to replace the invalidated cache entry. Thus, if the computing device A 370 receives a data request from an application 365 involving the invalidated cache entry, the computing device A 370 may respond to the request with the newer cache entry.

Figure 4:
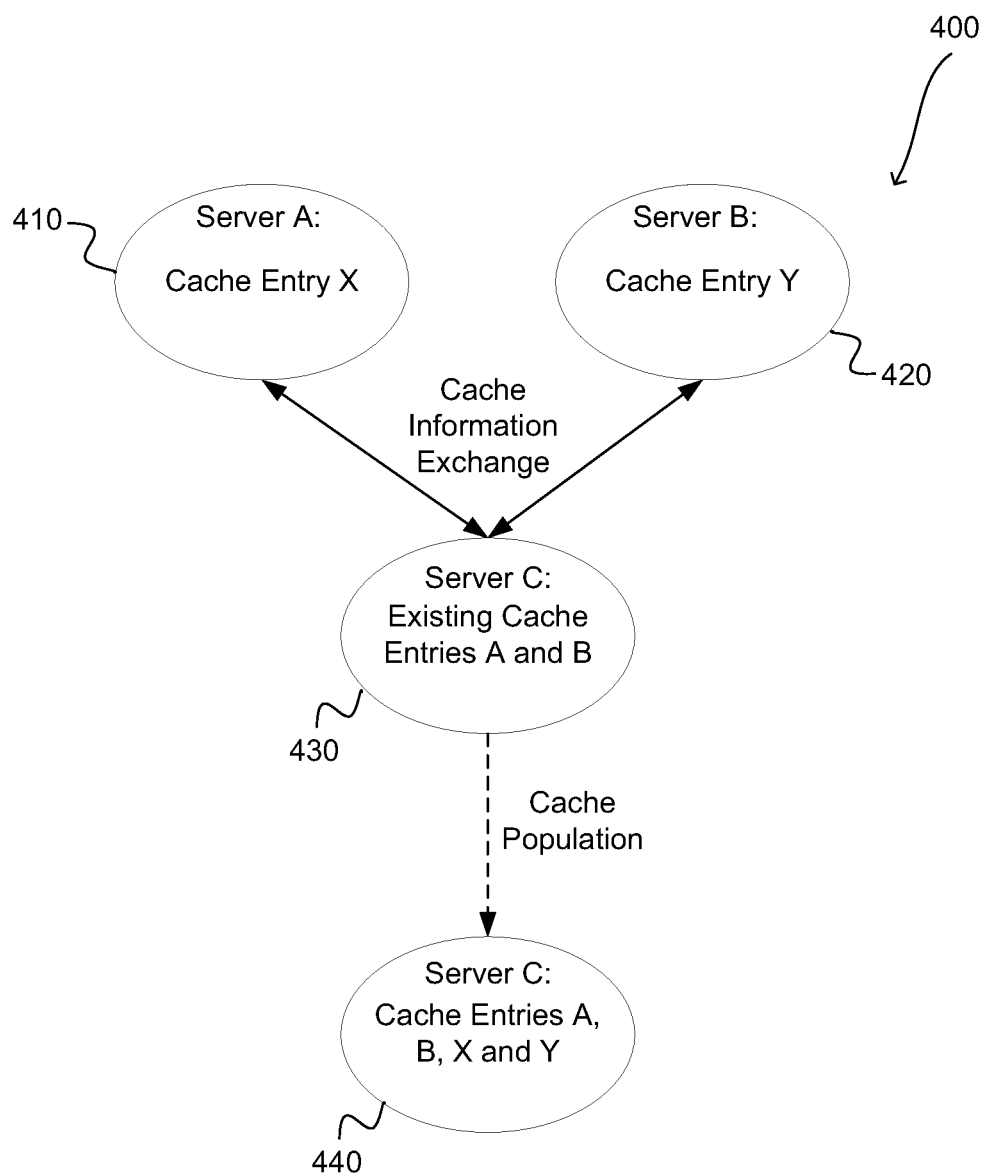
FIG. 4 is a diagram that illustrates an exemplary cache population by various servers according to an example of the present technology.

FIG. 4 illustrates an exemplary cache population 400 process using multiple servers with caches according to an example of the present technology. This figure further illustrates the accumulation of cache entries as cache entries are exchanged between servers. A server may be populated with cache entries that are likely to be requested in the future. For example, a server A 410 may include a cache entry X and a server B 420 may include a cache entry Y. In addition, a server C 430 may contain the existing cache entries A and B. Through a gossip protocol, the server C 430 may exchange cache update information with the server A 410 and the server B 420. The cache update information may include instructions that cache entry X and cache entry Y are hot. In other words, a hot cache entry may indicate a greater chance in achieving a cache hit rather than a cache miss (i.e., since hot entries are more likely to be accessed, it may be efficient to store the hot entries in the cache). Upon receiving the cache update information from Server A and Server B, the server C 430 may populate its cache with the entries X and Y. Therefore, a populated server C 440 may contain the cache entries A, B, X and Y after the cache update information is received from the server A 410 and the server B 420. A hot entry may be included in the cache for a certain period of time. For example, the hot entry may be included in the cache until the hot entry ceases to be hot. In other words, the entry may not be hot when the chance of achieving a cache miss is greater than receiving a cache hit. Alternatively, the hot entry may be included in the cache for a predetermined period of time (e.g., 24 hours).

In a cache population example, a cache may be pre-populated with authorization permissions. An employee may have permission to read and write to a file system. The cache may populate the employee's permission in order to prevent a database from being queried to verify the permission when the employee attempts to read and write to the file system. Rather, a cache may fetch this permission from the cache so internal systems (e.g., the sources of truth) may not be slowed down by checking for the authorization each time a request is made. As another cache population example, the cache may be pre-populated with a set of permissions that are hot for a period of time. For example, out of a set of 100,000 permissions, 1000 permissions (i.e., a sub-set of the entire set of permissions) may be accessed frequently and therefore, added to the cache using a gossip protocol. In some examples, the cache may be pre-populated with product data (e.g., a popular video game console listing during a holiday sale), audio information (e.g., a title song from a blockbuster film), and/or video information (e.g., a video clip of an upcoming film). In general, the cache may be pre-populated with certain data that is accessed frequently and/or expected to be accessed frequently.

Figure 5:
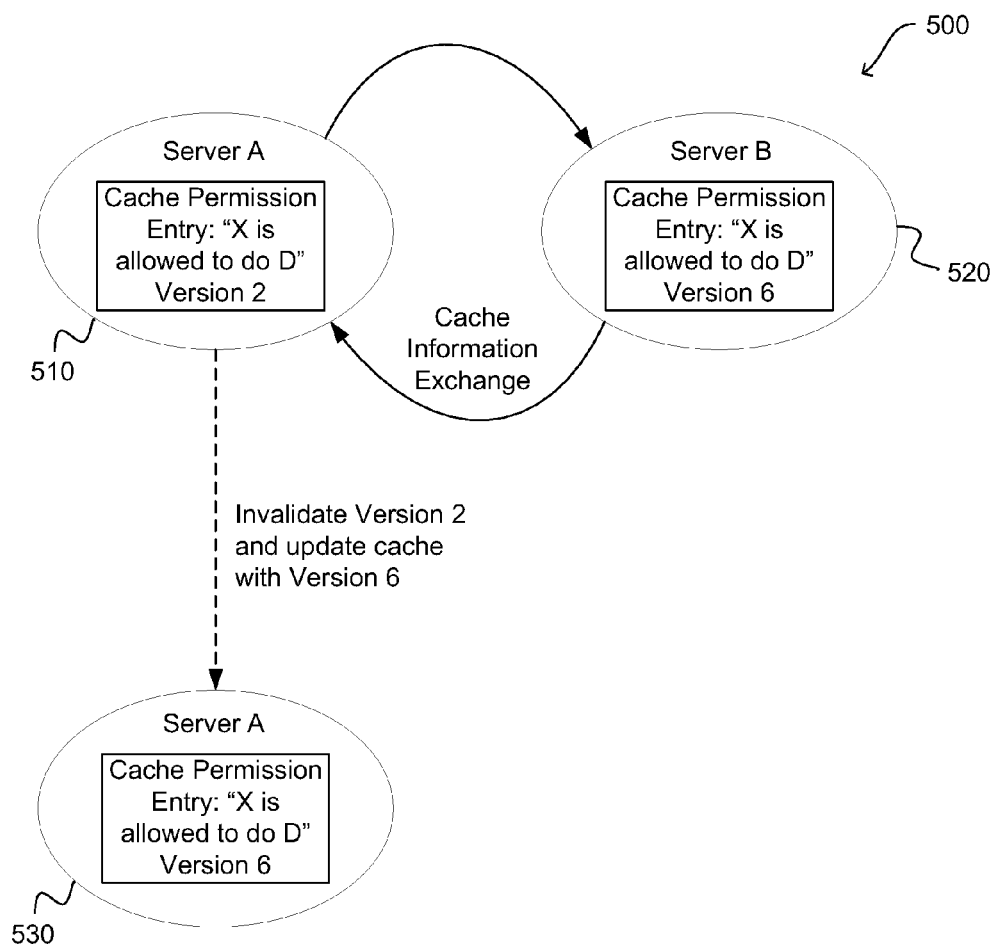
FIG. 5 is a chart that illustrates another exemplary cache update by servers according to an example of the present technology.

FIG. 5 is a drawing that illustrates another cache update 500 using multiple computing devices according to an example of the technology. Cache entries with certain states or versions may be exchanged between two servers. Certain states or version of a cache entry may override other states of the cache entry. Thus, a newer version of a cache entry may override a previous version of the cache entry. Specifically, the cache entries may have increasing or decreasing version numbers (e.g., version 3.0). The version number may be incremented or decremented to reflect the number of changes to the cache entry. A version number may also be a globally generated number used by a service dealing with the item (e.g., a permission).

The cache entries exchanged between the servers may dictate that versions of the cache entries that are above or equal to a certain version number may be valid. In other words, the validity of the cache entries may be determined by comparing a value of a version of a cache entry is with a value of a version of the cache entry received from another server, and then the newer of the two cache entries can be selected to be recorded in the cache. For example, a first cache may indicate that an item with a version number of 10 is not stale. In addition, a second cache may indicate that an item with a version number of 20 is stale. Thus, when the first cache and the second cache exchange cache update information (e.g., the valid cache entry with the newer version number) through the gossip protocol, it may be determined that items less than and including version 20 may be stale, so the first cache can mark the version 10 of the data as being stale. In other words, version 20 is the staleness of the item. Therefore, when the first cache and the second cache exchange cache update information with other caches, the staleness value of version 20 may be propagated to the other caches.

In FIG. 5, a server A 510 may include a cached permission entry. For example, the cached permission entry may be that "X is allowed to do D." In addition, the cached permission entry may have a version number (e.g., version two). The version number may indicate a particular age of the cached permission entry. A server B 520 may also include a cached permission entry that "X is allowed to do D." So, the cached permission entry may have a version number (e.g., version six) that is later than the version number of the cached permission entry included in the server A 510. Finding a version number that is greater than another version number for the same cache entry (e.g., version six compared to version two) may indicate that the smaller version number is an older version of the cached permission entry. Thus, a higher version number may indicate a newer version of the cached permission entry. By using a gossip protocol, server A 510 and server B 520 may exchange cache update information. Since server A 510 has a version two of the cached permission entry (which is presumably older than version six of the cached permission entry included in server B 520), server A 510 may replace its older version of the cached permission entry with the newer version of the cached permission entry and server B can discard the older cache entry that may have been received in the exchange. In other words, server A 510 may invalidate version two of the cached permission entry and update its cache with version six of the cached permission entry.

Server A 510 may store version two of the cached permission entry (i.e., the invalidated cache entry) in the cache for a defined period of time (e.g., 24 hours). Once the threshold for the defined period of time is reached, server A may remove the invalidated cache entry from the cache. The period of time may be selected based on a known validity time period or an expiry time period (e.g., 24 hours) for the cache entry. In addition, server A 510 may use a "first in first out" approach for determining which cache entries to invalidate. For example, the server 510 may determine that a cache invalidation gossiped for a certain time period (e.g., 8 hours) may likely have propagated to a significant number of servers in the network. Thus, the server 510 may evict that cache invalidation and instead gossip about a newer cache invalidation (e.g., 5 seconds old).

Server A 510 may store a predefined number of invalidated cache entries in a secondary cache or separate cache. Thus, the previous 500 invalidated cache entries may be stored in a separate storage location for invalid entries. As additional invalidated cache entries are stored in the storage location, older invalidated cache entries may be removed. The invalidated cache entries that are greater than a set number to be stored (e.g., 500 invalidated entries) may be deleted since the probability of receiving requests for these invalidated entries may be statistically low. These invalid entries can be stored in an invalid cache area or storage location so that other computing device may ask about such invalid cache entries.

In general, server A 510 may select a plurality of servers in a network in order to exchange cache update information through a gossip protocol. For example, server A 510 may use the gossip protocol to identify the available cache servers of the same cache class (e.g., server B 520) included in the network. In addition, server B 520 may be registered to a particular host class of servers. The host class may include a plurality of servers in the network. Thus, the server 520 can select a random server out of that particular host class (e.g., server B 530) in order to exchange cache update information.

Figure 6:
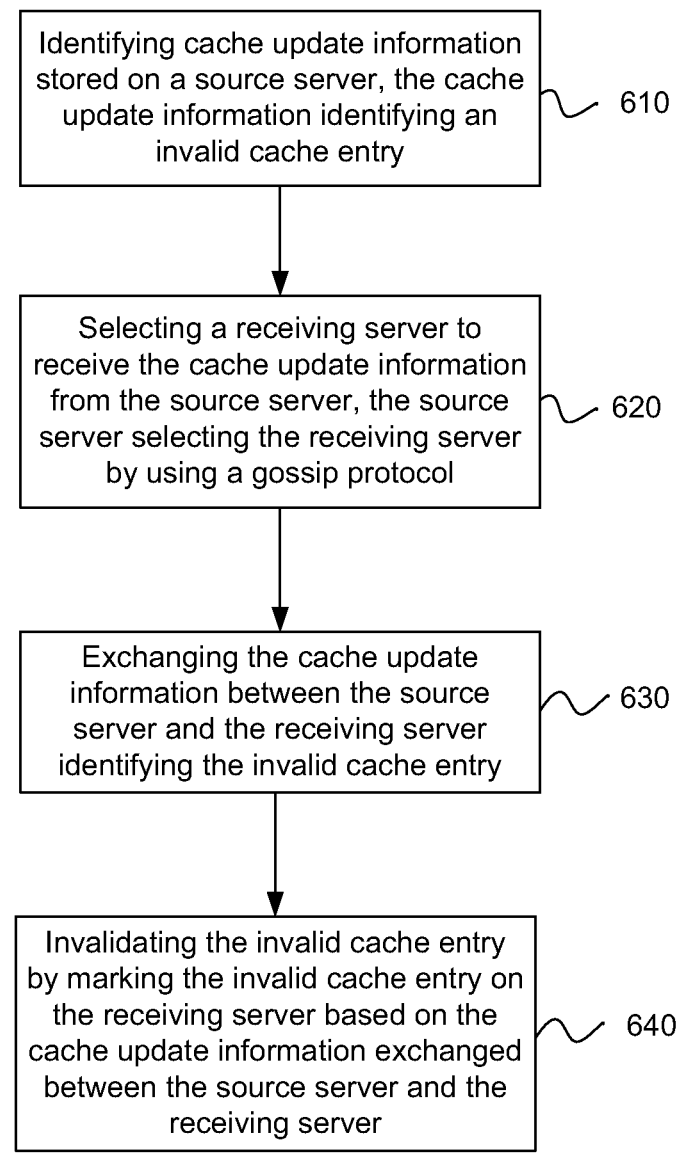
FIG. 6 is a flowchart of an example method for performing cache updates.

FIG. 6 illustrates an example of a method for performing cache data updates and invalidation. The method may include the operation of identifying cache update information stored on a source server, and the cache update information may identify an invalid cache entry, as in block 610. The invalid cache entry included in the cache update information may relate to an authorization permission. A receiving server may be selected to receive the cache update information from the source server, the source server selecting the receiving server by using a gossip protocol, as in block 620. The receiving server may be selected within a predefined time period based on the gossip protocol, and the receiving server may be selected at random based on a gossip protocol.

The source server may send the cache update information identifying the invalid cache entry to the receiving server, as in block 630. The source server may simultaneously send cache update information to a plurality of receiving servers. For example, the source server may send the cache update information simultaneously to three receiving servers. When exchanging an invalid cache entry, the source server may also send known cache updates (e.g., cache data invalidations) to the receiving server, and the source server may reciprocally request known cache updates from the receiving server. In response to the request, the receiving server may send known cache updates to the source server. The cache updates may include trending cache entries (e.g., audio files).

The invalid cache entry may be invalidated by marking the invalid cache entry on the receiving server based on the cache update information exchanged between the source server and the receiving server, as in block 640. For example, the source server may receive cache update information from the receiving server, and the cache update information may identify an invalid cache entry. Then, the invalid cache entry may be marked as invalid. Thus, the source server may update its own cache based on the cache update information received from the receiving server. In addition, the source server may invalidate a stale cache entry by deleting the stale cache entry and replacing the stale cache entry with a valid entry (i.e., not stale) from the receiving server. In a further example, an updated cache entry that is trending may be exchanged between the source server and the receiving server. The receiving server may be populated by adding a cache entry that is trending based on the cache update information exchanged with the source server.

In an additional versioning example, a first cache entry associated with the source server may be exchanged with a second cache entry associated with the receiving server, and the first cache entry may have a first version number and the second cache entry may have a second version number. The first version number of the first cache entry may be compared with the second version number of the second cache entry on the receiving server. The second cache entry may be determined to be stale based on the second version number being older than the first version number. In addition, the second cache entry may be invalidated by deleting the second cache entry that is stale and replacing the second cache entry with the first cache entry.

Figure 7:
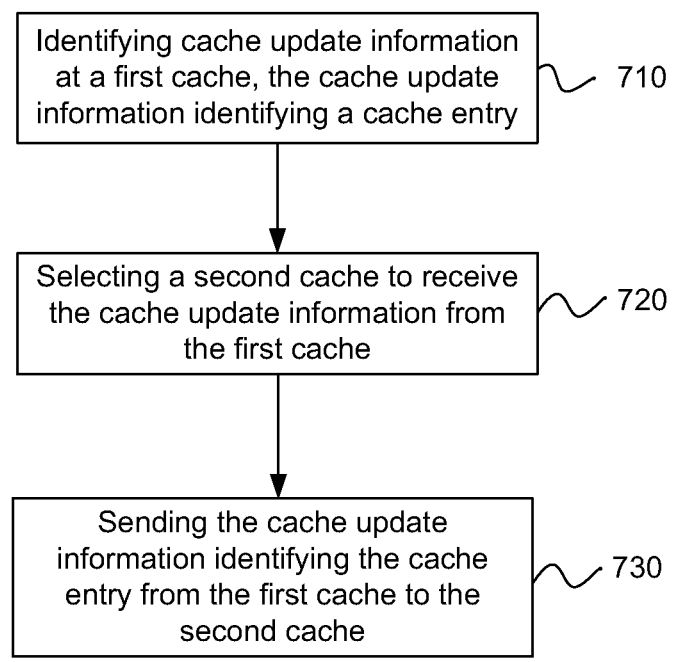
FIG. 7 is a flowchart of an example method for performing cache updates.

FIG. 7 illustrates an example of a method for performing cache data updates. The method may include the operation of identifying cache update information at a first cache, and the cache update information may identify a cache entry, as in block 710. The cache entry included in the cache update information may relate to an authorization permission, audio information, video information, network page information, web application components, purchasing components, account information, security information, and/or product data. The cache update information may identify an invalid cache entry (e.g., a stale cache entry) or an updated cache entry that is trending.

A second cache may be selected to receive the cache update information from the first cache, as in block 720. The first cache may select a second cache to receive the cache update information from the first cache based on a gossip protocol and within a predefined time period defined by the gossip protocol. Furthermore, the second cache may be selected at random and/or based on a pattern or a pseudo-random pattern according to a gossip protocol. In some examples, a second cache may be selected to receive the cache update information from the first cache. The second cache may be selected by registering the second cache to be included in a host class containing other caches, and then selecting the second cache at random from the host class.

The cache update information identifying the cache entry may be sent from the first cache to the second cache, as in block 730. The cache update information received by the second cache may be sent to at least one additional cache based on the gossip protocol. The first cache may request cache update information from the second cache after sending the cache update information to the second cache in order to undertake an exchange. In response to the request, the second cache may send cache update information to the first cache.

The cache entry at the second cache may be invalidated by marking the cache entry as invalid based on the cache update information received from the first cache. In addition, the cache update information may be stored on the second cache for a predefined time period before marking information in the second cache as stale. Furthermore, the cache entry at the second cache may be invalidated while still storing the cache entry that is invalid. When the stored invalid cache entries exceed a threshold number of stored cache entries, the cache entry from the second cache may be deleted.

Cache update information may be exchanged between the second cache and the first cache, the cache update information including a cache entry that has trending information. The second cache may be populated by adding the cache entry that includes the trending information based on the cache update information exchanged with the first cache. In one situation, a request to access a cache entry stored on the first cache may be received. The cache entry requested may be determined to be valid based on a staleness timeout period of the cache entry requested. The valid cache entry may be provided in response to the request received upon determining that the cache entry requested is within the staleness timeout period.

In one versioning example, a first cache entry associated with the first cache may be received at the second cache, the first cache entry having a first version value (version 4). The first version value (version 4) of the first cache entry may be compared with a second version value (version 3), the second version value (version 3) being associated with a second cache entry of the second cache. The second cache entry may be invalidated by replacing the second cache entry with the first cache entry, based on the second version value (version 3) of the second cache entry being older than the first version value (version 4) of the first cache entry.

Figure 8:
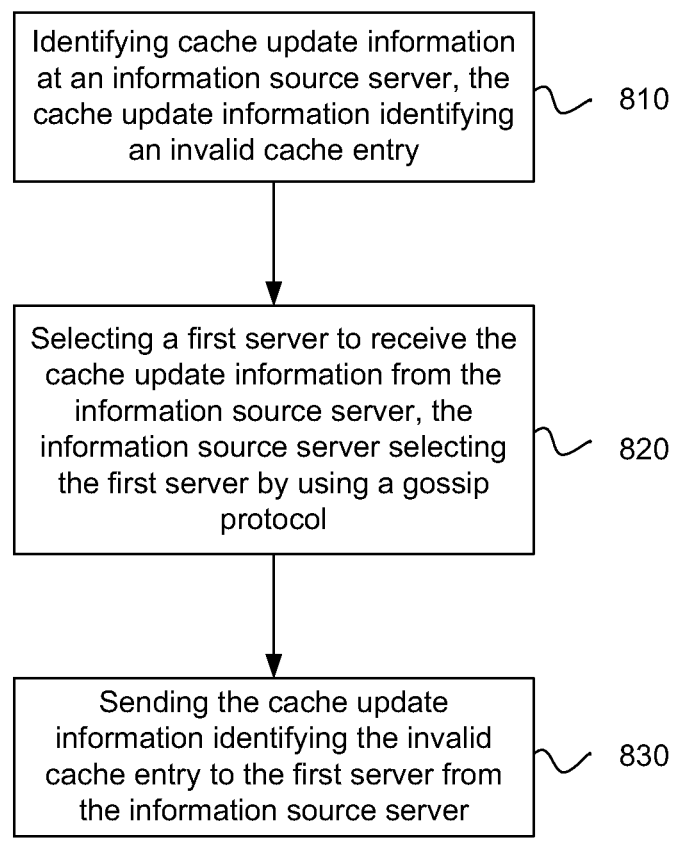
FIG. 8 is a flowchart of an example method for accessing cache data.

FIG. 8 illustrates an example of a method for accessing cache data. The method may include the operation of identifying cache update information at an information source server, the cache update information identifying an invalid cache entry, as in block 810. The cache update information may identify an invalid cache entry or an updated cache entry that is trending. In addition, the cache update information may identify cache updates that are stale. A first server may be selected to receive the cache update information from the information source server, the information source server selecting the first server by using a gossip protocol, as in block 820. The information source server may select the first server by using randomization based on the gossip protocol. The information source server may select the first server within a predefined time period based on the gossip protocol.

The cache update information identifying the invalid cache entry may be sent to the first server from the information source server, as in block 830. The information source server may also send the invalid cache entry to at least one additional server based on the gossip protocol. In response to the first server receiving the invalid cache entry from the information source server, the first server may send the invalid cache entry to a plurality of servers using on the gossip protocol. In addition, the cache update information identifying an updated cache entry that is trending may be received at the first server from the information source server.

Figure 9:
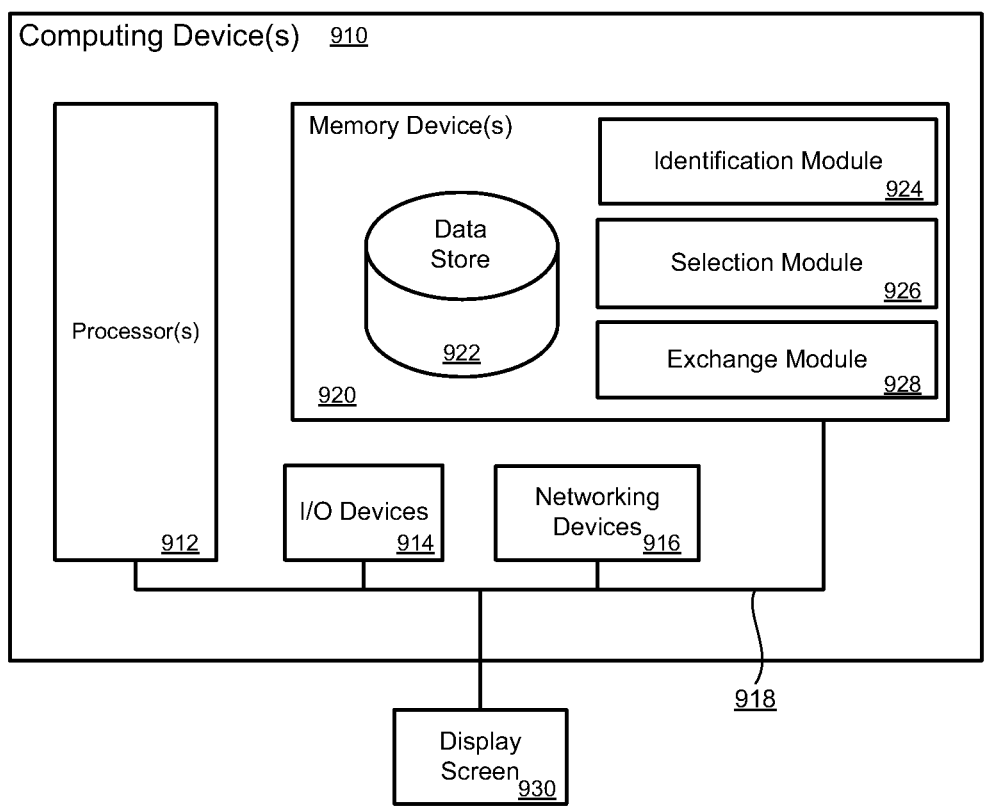
FIG. 9 is a block diagram that provides an example illustration of a computing device that may be employed in the networked environment of FIG. 2.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules that are executable by the processor(s) 912 and data for the modules. Located in the memory device 920 are modules executable by the processor. For example, an identification module 924, a selection module 926, and an exchange module 928, and other modules may be located in the memory device 920. The modules may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 930 that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for performing cache updates, the method comprising:
    under the control of one or more computer systems configured with executable instructions:
    identifying cache update information stored on a source server, the cache update information identifying an invalid cache entry;
    selecting a receiving server to receive the cache update information from the source server, the source server selecting the receiving server by using a gossip protocol;
    sending the cache update information identifying the invalid cache entry from the source server to the receiving server; and
    invalidating the invalid cache entry by marking the invalid cache entry on the receiving server based on the cache update information exchanged between the source server and the receiving server.

2. The method of claim 1, further comprising:
    sending an updated cache entry that is trending from the source server to the receiving server; and
    populating the receiving server by adding a cache entry that is trending based on the cache update information received from the source server.

3. The method of claim 1, further comprising:
    receiving a second cache entry associated with the receiving server, the second cache entry having a second version number;
    comparing the second version number of the second cache entry with a first version number of a first cache entry on the source server; and
    determining the second cache entry is stale based on the second version number being older than the first version number.

4. The method of claim 3, further comprising invalidating the second cache entry by deleting the second cache entry that is stale and replacing the second cache entry with the first cache entry.

5. The method of claim 1, wherein the invalid cache entry included in the cache update information relates to at least one of the following:
    an authorization permission;
    a trending cache entry;
    product information;
    audio information; and
    video information.

6. The method of claim 1, further comprising sending the cache update information from the source server to a plurality of receiving servers.

7. A method for performing cache updates, the method comprising:
    under the control of one or more computer systems configured with executable instructions:
    identifying cache update information at a first cache, the cache update information including a cache entry;

selecting a second cache at random to receive the cache update information from the first cache; and sending the cache update information identifying the cache entry from the first cache to the second cache.

8. The method of claim 7, further comprising sending the cache update information to a plurality of additional caches based on a gossip protocol.

9. The method of claim 7, further comprising invalidating the cache entry at the second cache by marking the cache entry as invalid based on the cache update information received from the first cache.

10. The method of claim 7, wherein selecting a second cache to receive the cache update information from the first cache is performed by the first cache based on a gossip protocol.

11. The method of claim 7, further comprising:
exchanging cache update information between the second cache and the first cache, the cache update information including a cache entry that has trending information; and
populating the second cache by adding the cache entry into the second cache, the cache entry including the trending information based on the cache update information received from the first cache.

12. The method of claim 11, wherein exchanging the cache update information between the second cache and the first cache comprises exchanging cache update information between a second cache server associated with the second cache and a first cache server associated with the first cache.

13. The method of claim 7, further comprising:
receiving a first cache entry from the first cache, at the second cache, the first cache entry having a first version value;
comparing the first version value of the first cache entry with a second version value, the second version value being associated with a second cache entry of the second cache; and
invalidating the second cache entry by replacing the second cache entry with the first cache entry, based on the second version value of the second cache entry being older than the first version value of the first cache entry.

14. The method of claim 7, further comprising:
receiving a request to access a cache entry stored on the first cache;
determining whether the cache entry requested is valid based on a staleness timeout period of the cache entry requested; and
providing a valid cache entry in response to the request received upon determining that the cache entry requested is within the staleness timeout period.

15. The method of claim 7, wherein selecting a second cache to receive the cache update information from the first cache comprises selecting the second cache using a random time period based on a gossip protocol.

16. The method of claim 7, wherein selecting a second cache to receive the cache update information from the first cache comprises selecting the second cache at random based on a gossip protocol.

17. The method of claim 7, wherein selecting a second cache to receive the cache update information from the first cache comprises:
registering the second cache to be included in a host class; and
selecting the second cache at random from the host class.

18. The method of claim 8, wherein invalidating the cache entry at the second cache further comprises:
storing the cache entry that is invalid at the second cache; and
deleting the cache entry from the second cache upon exceeding a threshold number of stored cache entries that are invalid.

19. The method of claim 7, wherein the cache entry included in the cache update information relates to at least one of the following:
an authorization permission;
audio information;
video information; and
product data.

20. A method for accessing cache data, the method comprising:
under the control of one or more computer systems configured with executable instructions:
identifying cache update information at an information source server, the cache update information identifying an invalid cache entry;
selecting a first server to receive the cache update information from the information source server, the information source server selecting the first server by using a gossip protocol; and
sending the cache update information identifying the invalid cache entry to the first server from the information source server.

21. The method of claim 20, further comprising:
receiving the cache update information identifying the invalid cache entry at the first server as sent from the information source server;
selecting a second server to receive the cache update information from the first server, the first server selecting the second server by using the gossip protocol; and
sending the cache update information identifying the invalid cache entry from the first server to the second server.

22. The method of claim 20, further comprising:
receiving the cache update information identifying an updated cache entry that is trending at the first server from the information source server; and
populating the first server by adding a cache entry that is trending from the cache update information received from the information source server.

23. The method of claim 20, further comprising:
receiving a request from an application to access a cache entry stored on the first server;
querying the information source server to determine whether the cache entry requested is valid;
receiving a response from the information source server verifying that the cache entry requested is valid; and
providing a valid cache entry from the first server to the application in response to the request received.

24. A system for performing cache data invalidation, the system comprising:
a processor;
a memory device including a cache data store to store a plurality of cache entries of data, and instructions that, when executed by the processor, cause the processor to execute:
an identification module configured to identify cache update information stored on a cache data store, the cache update information identifying an invalid cache entry, an updated cache entry, or a cache entry that is trending;
a selection module configured to randomly select a receiving server to receive the cache update information from the cache data store using a gossip protocol; and an exchange module configured to exchange the cache update information identifying the invalid cache entry with the receiving server.

25. The system of claim 24, further comprising a cache data invalidation module configured to mark the invalid cache entry as invalid based on the cache update information received from the receiving server.

26. The system of claim 24, further comprising a cache population module configured to add a trending cache entry or an updated cache entry to a second cache data store based on the cache update information exchanged.

27. The system of claim 24, wherein the exchange module is further configured to:
   exchange a first cache entry from the cache data store and a second cache entry from the receiving server, the first cache entry having a first version number and the second cache entry having a second version number;
   compare the first version number from the cache data store with the second version number of the second cache entry; and
   determine that the second cache entry is stale based on the second version number being older than the first version number.

\* \* \* \* \*